(No Model.)
G. F. JAISLE.
FERTILIZER DISTRIBUTER.
No. 356,769. Patented Feb. 1, 1887.
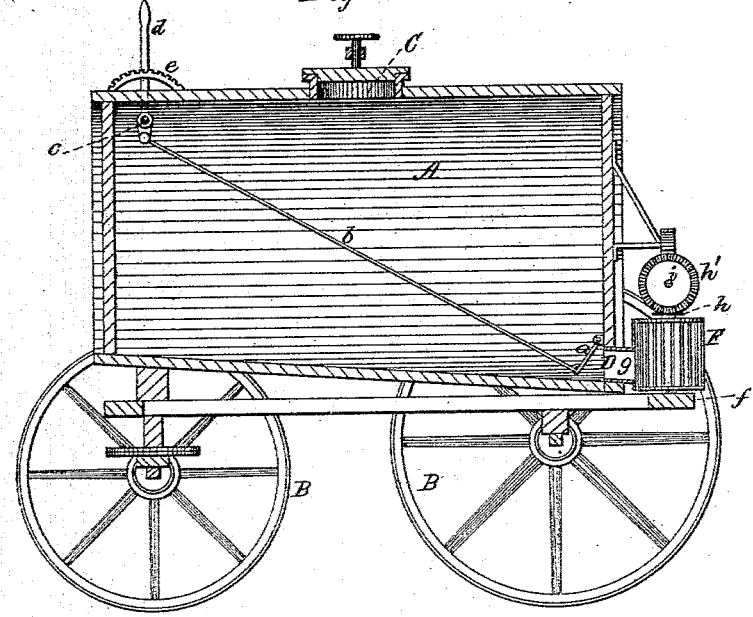
Fig. 1.
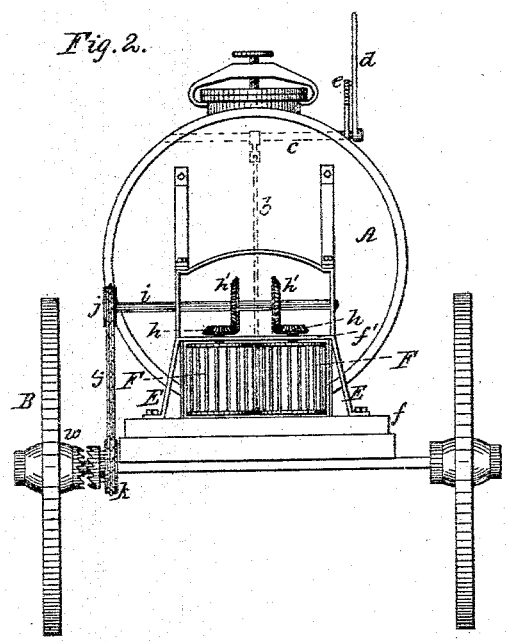
Fig. 2.
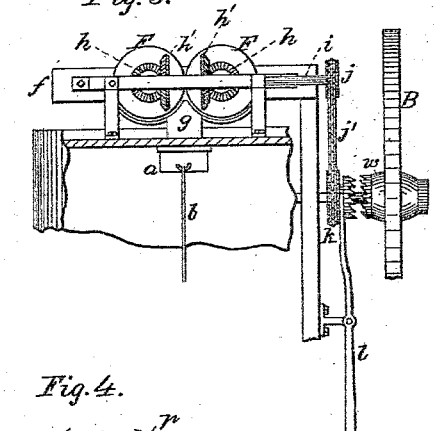
Fig. 3.
Fig. 4.
Witnesses:
W. C. Tirdinston.
Inventor
George F. Jaisle
by
Attorney.

UNITED STATES PATENT OFFICE.

GEORGE F. JAISLE, OF CINCINNATI, OHIO.

FERTILIZER-DISTRIBUTER.

SPECIFICATION forming part of Letters Patent No. 356,769, dated February 1, 1887.

Application filed September 16, 1886. Serial No. 213,724. (No model.)

*To all whom it may concern:*

Be it known that I, GEORGE F. JAISLE, a citizen of the United States, residing at Cincinnati, Ohio, have invented new and useful Improvements in Fertilizer-Distributers, of which the following is a specification.

My invention relates to apparatus for distributing liquid fertilizers upon fields or growing crops; and it consists in the apparatus and mechanism hereinafter described in detail, and illustrated in the accompanying drawings, forming part of this specification, in which—

Figure 1 is a general side elevation of the apparatus complete, the containing-vessel being sectioned for clearness of illustration; Fig. 2, a rear elevation of the apparatus; Fig. 3, a plan view of the distributing mechanism proper; and Fig. 4, a horizontal cross-section of the centrifugal distributing-wheels, showing their construction and relation to the feed-spout.

Referring now to the drawings, in which the parts referred to are indicated by the letters of reference, A designates a barrel-shaped containing-trough, mounted upon ordinary running-gear, B, for draft purposes by horse-power, in the usual manner. The vessel A is provided with a filling-aperture, C, with a suitable closure, and with a vent-aperture, D, at the bottom and rear. The latter is closed by a flap-valve, a, opening inward, controlled by a rod, b, having a crank-connection with a counter-shaft, c, mounted in or upon the containing-tank, the latter being provided with an exterior hand-lever, d, moving over a rack-bar, e, for the regulation of the degree of opening of the valve a, as a means of regulating the quantity of fluid passing out from the tank.

In rear of the tank, in a suitable supporting-frame, E, are mounted two vertically-arranged wheels, F F, constructed in the manner of the ordinary undershot water-wheels, with radial partitions p set between end disks, Figs. 2 and 4, and placed side by side, so that their upper and lower disks and the outer ends of the partitions roll in contact. These wheels are fixed upon pivot-studs projecting above and below, the lower ends revolving in socket-bearings upon the lower cross-brace, $f$, of the frame E, and the upper ends carried through the upper cross-brace, $f'$, of the frame E, in which the studs have their upper bearings. The wheels F are arranged immediately in rear of the discharge-aperture D of the tank A, the aperture D being continued into a spout, $g$, flared to the contour of the wheels, and with its bottom carried in between them, to prevent, as far as may be, the loss of liquid below without interfering with the free revolution of the wheels.

The object of the construction is to deliver the fluid contents of the tank through the spout $g$ horizontally between the wheels F into the spaces between their partitions, and by the rapid interrotation of the wheels in opposite directions to pass the same through and spread it in a wide horizontal sheet or shower behind the vehicle as the latter moves forward.

The rotation of the wheels F is accomplished by the following mechanism: The upper ends of the wheel pivot-studs project through the cross-brace $f'$, and are surmounted by bevel-pinions $h$, meshing with similar pinions, $h'$, upon a horizontal counter-shaft, $i$, mounted in vertical projections of the frame E. At the projecting end of the counter-shaft $i$ is a sprocket driving-wheel, $j$, driven by a chain, $j'$, from a sprocket-wheel, $k$, centered loose upon the rear axle of the vehicle. The hub of the latter sprocket-wheel is formed as a clutch to engage with the bearing-wheel $w$ of the running-gear B, and the wheel $k$ is adapted to be moved laterally upon the axle into and out of engagement with said wheel $w$ by means of a lever, $l$, pivoted to the side of the running-gear framing, and engaging by the ordinary yoke and stud connection in a peripheral groove in the hub of the sprocket-wheel $k$.

The frame E is suitably secured either to the tank A or to the running-gear frame, so as to maintain a proper relation between the delivery-spout $g$ and the distributing-wheels F, and the character and limits of the ultimate distribution of the fertilizing liquid upon the ground will depend upon the speed of rotation of the distributing-wheels, which act to scatter and spread the liquid at the rear by centrifugal force, and by the quantity of liquid delivered to the wheels. The former condition—the rotative speed of the wheels—is determined by the rotative speed of the bearing-wheel $w$ and by the relative sizes of the gear-wheels and connections, while the feed of liquid to the wheels is regulated by the valve $a$ and its provisions for adjustment.

I claim as my invention and desire to secure by Letters Patent—

1. The combination, in a fertilizer-distributer, of a vessel for containing the fertilizer, a pair of vertical distributing-wheels embodying radial partitions and revolving in opposite directions, and a spout leading from the vessel between the two wheels to deliver the fertilizer horizontally between the adjacent peripheries of the wheels, which coact to scatter it in a horizontal expanding shower, substantially as described.

2. The combination, in a fertilizer-distributer, of a vessel for containing the fertilizer, a pair of vertical distributing-wheels revolving in opposite directions, and comprising upper and lower disks and radial partitions, with the disks and the outer ends of the partitions in rolling contact with a spout leading from the vessel between the two wheels to deliver the fertilizer horizontally between the two wheels, which coact to scatter it in a horizontal expanding shower, substantially as described.

3. The combination, in a fertilizer-distributer, of a vessel for containing the fertilizer, a pair of vertical distributing-wheels revolving in opposite directions, and a spout leading from the vessel and flared to the contour of the two wheels and delivering the fertilizer horizontally between said wheels, which coact to distribute it in a horizontal expanding shower, substantially as described.

In testimony whereof I have hereunto set my hand in the presence of two subscribing witnesses.

GEORGE F. JAISLE.

Witnesses:
L. M. HOSEA,
E. L. KERR.